(No Model.)
J. C. SCHUMAN.
MANUFACTURE OF STARCH.
No. 344,411. Patented June 29, 1886.
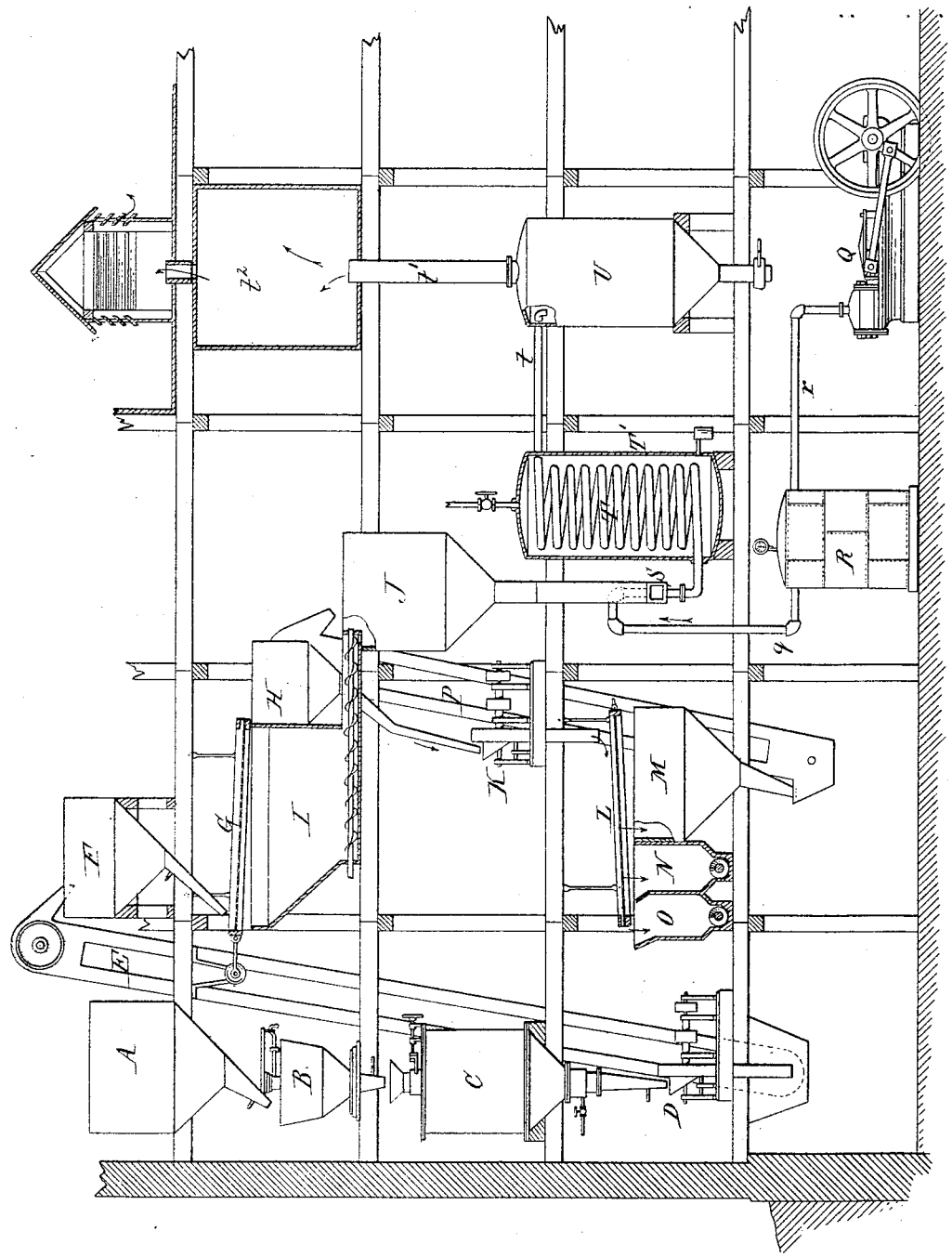
Witnesses: Chas. J. Buchheit, Geo. J. Buchheit Jr.
J. C. Schuman, Inventor.
By Wilhelm Bonner,
Attorneys.

United States Patent Office.

JOHN C. SCHUMAN, OF AKRON, ASSIGNOR TO WILLIAM T. JEBB, OF BUFFALO, NEW YORK.

MANUFACTURE OF STARCH.

SPECIFICATION forming part of Letters Patent No. 344,411, dated June 29, 1886.

Application filed November 2, 1885. Serial No. 181,595. (No model.)

*To all whom it may concern:*

Be it known that I, JOHN C. SCHUMAN, of Akron, in the county of Erie and State of New York, have invented a new and useful Improvement in the Manufacture of Starch, of which the following is a specification.

This invention relates to an improvement in the manufacture of crude starch or starch-meal, and has for its object to produce at small expense a dry crude starch which is substantially free from impurities, and which may be sold and shipped as an article of trade or be used for various industrial purposes.

The accompanying drawing represents a sectional elevation of a plant of machinery by which my invention may be practiced.

A represents a bin or receptacle, which receives the Indian corn or maize, and from which the latter passes to the weigh-hopper B. C is the steep tank or vat, in which the corn is steeped, preferably at a temperature of about 140° Fahrenheit, for about fifteen hours, or longer when the product is intended to be worked into what is known as "finished starch;" or the starchy product obtained from the sieving operation, hereinafter described, may be further soaked when commercial starch is intended to be made. This temperature is preferably maintained in the steep-vat by renewing the water from time to time. When the steeping is completed, the warm water is drawn off and cold water preferably admitted into the steep-tank, whereby the corn is chilled, which tends to toughen the hulls and loosen the latter and the germs from the starchy bodies of the kernels. The steeped corn is next thoroughly drained and then fed into a reducing-machine, D, in which the corn is reduced in such manner that the hulls and germs are detached from the starchy portions in large flakes or fragments, while the starch is reduced to a meal of a comparatively higher degree of fineness, so that the hulls and germs can be separated from each other and from the starch-meal by sifting, the starch-meal passing through the fine cloth of the sieve, the fragments of the germs through a coarser cloth, while the hulls tail off. The reducing-machine which I prefer to employ for this purpose consists of several concentric rows of beaters or whippers revolving at a high speed in opposite directions within an inclosing-case. The outer row of beaters is provided with one or more scrapers, which run in close proximity to the inclosing-case and prevent the reduced material from adhering to the inner side thereof. If preferred, however, a disk-mill or a roller-mill or other suitable reduction-machine may be employed for this purpose.

E represents an elevator, which elevates the reduced material to a receiver, F, from which the material is delivered upon a separating-screen, G. The latter is preferably clothed with cloth of the same fineness throughout, so that it permits only the starch-meal to pass through, while the germs and hulls tail off together into a receptacle, H. The starch-meal is collected in a receptacle, I, from which it is conveyed to a receiver, J. The germs and hulls pass from the receptacle H into a second reducing-machine, K, which is similar in construction to the first, and in which the remaining starch particles are detached from the hulls and germs. The product of this reduction is next separated by a screen, L, which is clothed for about two-thirds of its length from the head with fine cloth, and for the remainder of its length with coarse cloth. The starch-meal passes through the fine cloth into a receptacle, M, the fragments of germs pass through the coarse cloth into a receptacle, N, and the hulls tail off into a receptacle, O. The starch-meal which is collected in the receiver M is elevated by an elevator, P, into the receiver J. The starch-meal which is in this manner obtained from the corn is substantially free from fragments of the hulls and germs, but it still contains some of the moisture which the grain had absorbed in the steep, and which has not been completely removed from the meal by the various operations which it has undergone, although a portion of such moisture has been removed during the operations of reducing and sifting, especially when an air-current is blown or drawn into the reducing-machines together with the material to be reduced. This moist starch-meal is next subjected to a drying operation in the following manner:

Q represents an air-compressor of any suitable or well-known construction. A cylinder machine provided with a reciprocating piston is preferred; but a rotary machine may be employed, if desired.

R is a receiver, which receives the compressed air from the compressor Q by a pipe, $r$, and from which the compressed air is conducted by a pipe, $q$, to the feeding device S. The preferred construction of the latter is described and shown in detail in another application for patent filed by me of even date herewith, and to which reference is here made for a complete description of said feeding device. This feeder connects with the lower end of the drying coil or passage T, which is arranged in a heating tank or jacket, T', which latter is preferably heated by filling it with steam. The moist starch-meal collected in the receiver J is delivered by the feeder S intermittently or at regular intervals into the current of dry air which is rapidly driven through the coil T by the compressor Q. In passing through the coil the dry air comes in intimate contact with every particle of the starch-meal and absorbs the moisture therefrom, which operation is somewhat expedited by the heat which is applied to the external surface of the coil in the jacket T'; but this heat should not be permitted to reach a point at which it tends to scorch or discolor the starch. The discharge end $t$ of the coil opens into a receiver, U, in which the dry starch-meal is deposited, while the air is permitted to escape through a spout, $t'$, into a dust-room, $t^2$. The starch-meal which is collected in the receiver U may be cooled, if necessary, by passing it through a current of cold air, or in any other suitable manner. The germs and hulls may be dried in the same manner, either separately or together; but I prefer to dry these products separately, as the germs contain a larger percentage of moisture and are heavier than the hulls, which latter are more readily dried than the germs. In this manner a dry white starch-meal substantially free from impurities is obtained directly from the corn in a simple and inexpensive manner and by a continuous process, which starch-meal may be sold to the trade in the condition in which it is produced by this process, and which is suitable for many industrial purposes—for instance, as a substitute for malt in brewing, for the manufacture of grape-sugar and glucose, culinary and laundry starch, distilled spirits, and other products. The offal, which is similarly dried, furnishes a desirable food for cattle, &c., and can be stored for future use or sale, or be shipped at small cost to the points of consumption, without fermenting or deteriorating, thereby affording opportunities for disposing of the offal profitably.

I claim as my invention—

1. The herein-described method of producing a dry starch-meal or crude starch from Indian corn or maize, which consists in steeping the corn, then reducing the corn, whereby the germs and hulls are detached from the starchy portions of the kernels, then separating the starch from the germs and hulls, and then feeding the separated starch into a current of dry air, and causing the air-current to propel the starch through a pipe or passage in which the air absorbs the moisture from the starch, substantially as set forth.

2. The herein-described method of producing a dry offal in the manufacture of starch from Indian corn or maize, which consists in steeping the corn, then reducing the corn, whereby the germs and hulls are detached from the starchy portions of the kernels, then separating the starch from the germs and hulls, and then feeding the offal into a current of dry air, and causing the air-current to propel the offal through a pipe or passage in which the air absorbs the moisture from the offal, substantially as set forth.

3. The herein-described method of producing dry starch-meal or crude starch from Indian corn or maize, which consists in steeping the corn, then reducing the corn, whereby the germs and hulls are detached from the starchy portions of the kernels, then separating the starch from the germs and hulls, and then feeding the separated starch into a current of air, and causing the air-current to propel the starch through a pipe or passage in which the air absorbs the moisture from the starch by the aid of heat, substantially as set forth.

4. The herein-described method of producing a dry offal in the manufacture of starch from Indian corn or maize, which consists in steeping the corn, then reducing the corn, whereby the germs and hulls are detached from the starchy portions of the kernels, then separating the starch from the germs and hulls, and then feeding the offal into a current of air, and causing the air-current to propel the offal through a pipe or passage in which the air absorbs the moisture from the offal by the aid of heat, substantially as set forth.

Witness my hand this 28th day of October, 1885.

J. C. SCHUMAN.

Witnesses:
THOS. W. ADAMS,
T. A. JEBB.